Figure 1:
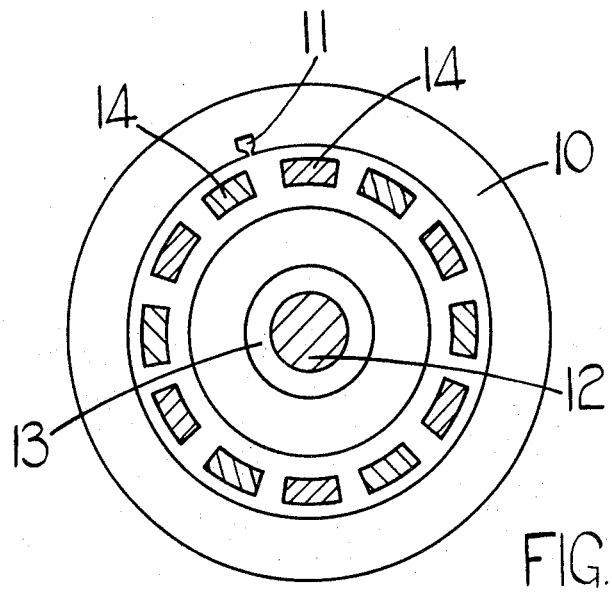

United States Patent

[11] 3,629,636

[72] Inventor William Frank Hill
 2 Oakridge Close, Stafford, Staffordshire, England
[21] Appl. No. 22,510
[22] Filed Mar. 25, 1970
[45] Patented Dec. 21, 1971
[32] Priority Apr. 2, 1969
[33] Great Britain
[31] 17,165/69
[73] Assignee Joseph Lucas (Industries) Limited, Birmingham, England

[54] ALTERNATORS UTILIZING TWO-PHASE T-CONNECTED WINDINGS TO GET THREE-PHASE OUTPUT
5 Claims, 3 Drawing Figs.
[52] U.S. Cl............................................... 310/184, 310/68 D, 310/200, 310/203, 322/64
[51] Int. Cl............................................. H02k 3/28
[50] Field of Search........................................ 310/146, 168, 184–189, 200, 171, 68 D, 162, 163, 208, 203; 322/63, 64

[56] References Cited
UNITED STATES PATENTS

| 712,737 | 11/1902 | Steinmetz...................... | 310/68 D |
| 2,451,945 | 10/1948 | Johns ........................... | 322/63 X |
| 2,825,830 | 3/1958 | Davis............................ | 310/184 X |
| 3,107,562 | 1/1962 | Duane........................... | 322/63 X |
| 3,325,661 | 6/1969 | Parsons ........................ | 310/184 X |
| 3,452,229 | 6/1969 | Pimlott et al. ................. | 310/168 |
| 3,512,065 | 5/1970 | Fengler ........................ | 310/184 X |

Primary Examiner—D. F. Duggan
Assistant Examiner—Mark O. Budd
Attorney—Holman & Stern ABSTRACT: An alternator including a stator structure and a rotor structure the latter defining poles and the stator structure having stator slots equal to twice the number of poles there being disposed in the stator slots a two-phase winding which comprises a pair of windings which are disposed in the slots so that the voltages induced between the ends of the windings are in quadrature. The one winding has more turns than the other winding so that a three-phase output voltage is obtained at the ends of the windings.

ALTERNATORS UTILIZING TWO-PHASE T-CONNECTED WINDINGS TO GET THREE-PHASE OUTPUT

This invention relates to alternators having a three-phase output and including a rotor structure and a stator structure the rotor structure producing a rotating field. In order to effect a reduction in the cost of producing small mass-produced alternators such for instance as are used on automobiles it is the practice to wind the windings on a high-speed winding machine. The successful operation of such a machine requires fairly large slot apertures in the stator structure so that the wires forming the windings can be easily passed therethrough into the slots.

With a three-phase alternator wound in the conventional manner with the phase windings electrically disposed at 120° relative to each other, there will be three slots per rotor pole. With the need to provide wide openings to each slot the amount of iron or ferrous material adjacent the rotor is reduced so that the efficiency of the alternator is reduced.

An object of the invention is to provide a rotating field alternator which produces a three-phase output at its line terminals with the phase voltages effectively 120° apart and yet which has a reduced number of slots per pole as compared with the conventional rotating field alternator.

An alternator in accordance with the invention is provided with a stator structure having two slots per rotor pole and the stator slots accommodate a two-phase winding which is T-connected to produce a three-phase output.

Figure 2:
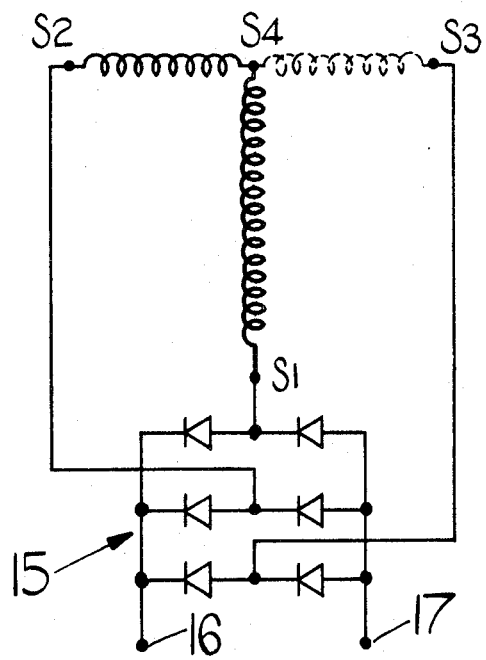
Figure 3:
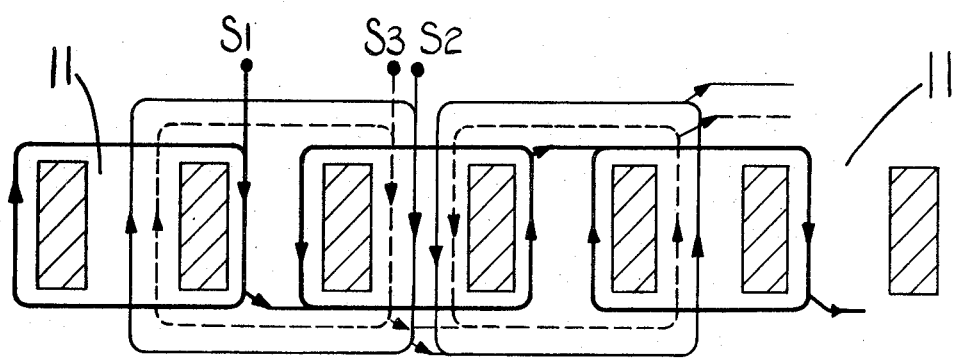

In the accompanying drawings:

FIG. 1 is a sectional side elevation of one example of an alternator in accordance with the invention, FIG. 2 is an electric circuit diagram of the stator connections of the alternator and, FIG. 3 is a developed view of the inside of the stator structure showing the winding configuration.

With reference to FIG. 1 of the drawings there is provided an annular stator structure 10 which is formed of a stack of laminations prepunched to define stator slots 11, only one of which is seen in FIG. 1. The stator structure in known manner is sandwiched between a pair of end supports (not shown), which support bearings for a rotary shaft 12. Mounted upon the shaft is a rotor structure including a magnet core 13 having at its opposite ends plates (not shown) which define pole pieces 14 extending inwardly in opposite axial directions. The pole pieces 14 which extend from the plates are alternately disposed. Surrounding the core 13 is a winding (not shown) which oppositely polarizes the aforesaid plates with the result that adjacent pole pieces 14 are of opposite magnetic polarity.

With reference to FIG. 3 the number of slots 11 formed in the internal periphery of the stator structure 10 is equal to twice the number of poles on the rotor so that in the particular example there are 24 slots spaced equally around the stator structure. Wound in the stator slots are two windings in which voltages are induced as the rotor structure rotates. The voltages are in time quadrature and the number of turns in the two windings is different. As shown in FIG. 2 the larger winding is $S_2-S_3$ and the smaller winding $S_1-S_4$. Point $S_4$ is the center point of the winding $S_2-S_3$. The number of turns in the winding $S_1-S_4$ is approximately $\sqrt{3/2}$ times the number of turns in the winding $S_2-S_3$. From the ends $S_2$, $S_3$ and $S_1$ of the windings, an AC three-phase output can be obtained in which the phase voltages are effectively at 120°. In order to provide a DC output the ends $S_2$, $S_3$ and $S_1$ are connected to a rectifier unit 15 from which a rectified DC output can be obtained at terminals 16 and 17.

FIG. 3 shows the winding arrangement and it will be seen that each coil embraces two stator teeth, and that the coils of the windings are displaced by one stator tooth to ensure that the voltages are in quadrature. In the particular example the winding $S_2-S_3$ has 22 conductors per slot and the winding $S_1-S_4$ 19 conductors per slot. Moreover, the winding $S_2-S_3$ is inserted in the slots before the winding $S_3-S_4$ is wound.

There are several advantages to be gained by using the winding arrangement described as compared with a conventional three-phase winding. It has been shown that the electrical performance of the machine can be improved as compared with a comparable machine. Furthermore, whereas a conventional three-phase machine would have a number of slots equal to three times the number of poles on the rotor, the present machine has only twice the number of poles. This facilitates winding of the stator structure particularly when this is carried out by a machine. Moreover, the reduced number of slots means that the slot frequency is lower and therefore any objectionable noise will be generated at a higher rotational speed and such noise is likely to be swamped by other mechanical noise.

Having thus described my invention what I claim as new and desire to secure by Letters Patent is:

1. An electrical alternator for producing a three-phase output in which the phase voltages are spaced by an equal amount, the alternator comprising a stator structure, slots formed in the stator structure, output windings located in the slots, a rotor structure defining rotor poles and when rotated, producing a rotating magnetic field, said stator structure having two slots per rotor pole and the stator slots accommodating a two-phase winding which is T-connected to produce a three-phase output having substantially equal phase voltages.

2. An alternator as claimed in claim 1 in which the two-phase winding comprises a pair of windings, said windings being disposed within the stator slots so that the voltages induced in the windings are in time quadrature.

3. An alternator as claimed in claim 2 in which one of the windings has more turns than the other, said one winding having a center tap to which is connected one end of the other winding.

4. An alternator as claimed in claim 3 in which the number of turns on the smaller winding is approximately $\sqrt{3/2}$ times the number of turns on the larger winding.

5. An alternator as claimed in claim 4 in which the winding having the greater number of turns is inserted in the stator slots before the other winding.

* * * * *